(12) United States Patent
Artobello et al.

(10) Patent No.: US 7,296,151 B2
(45) Date of Patent: Nov. 13, 2007

(54) APPARATUS, SYSTEM, AND METHOD FOR SHARING A CACHED SECURITY PROFILE IN A DATABASE ENVIRONMENT

(75) Inventors: Michael R. Artobello, Concord, CA (US); Kevin R. Stewart, International Falls, MN (US); Yoshinobu Ueno, San Jose, CA (US); Jack C. Yuan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 776 days.

(21) Appl. No.: 10/717,743

(22) Filed: Nov. 20, 2003

(65) Prior Publication Data
US 2005/0114604 A1 May 26, 2005

(51) Int. Cl.
*G06F 9/00* (2006.01)
(52) U.S. Cl. .................. 713/164; 713/166; 713/168
(58) Field of Classification Search ............... 713/164, 713/166, 168
See application file for complete search history.

(56) References Cited

U.S. PATENT DOCUMENTS

| | | | |
|---|---|---|---|
| 5,241,675 A | 8/1993 | Sheth et al. ............... 395/600 |
| 5,493,668 A | 2/1996 | Elko et al. ................. 395/457 |
| 5,640,552 A * | 6/1997 | Yianilos .......................... 707/5 |
| 5,694,590 A * | 12/1997 | Thuraisingham et al. ...... 707/9 |
| 6,006,325 A | 12/1999 | Burger et al. ............... 712/214 |
| 6,292,705 B1 | 9/2001 | Wang et al. ................... 700/5 |

OTHER PUBLICATIONS

Timothy Mann et al., "A Coherent Distributed File Cache With Directory Write-Behind", ACM Transactions of Computer Systems, vol. 12. No. 2, May 1994, pp. 123-164.

* cited by examiner

*Primary Examiner*—Thomas R. Peeso
(74) *Attorney, Agent, or Firm*—Kunzler & McKenzie

(57) ABSTRACT

An apparatus, system, and method are provided for sharing a cached security profile in a database environment. The apparatus, system, and method include a cache module for caching a security profile accessible to primary tasks and secondary tasks. An identification module is provided that distinguishes between primary tasks authorized to refresh the security profile and secondary tasks. A refresh module cooperates with the cache module and identification module to selectively refresh the security profile in response to a refresh request and expiration of the security profile such that an old version of the security profile is retained for use by secondary tasks until an execution window closes.

29 Claims, 7 Drawing Sheets

APPARATUS, SYSTEM, AND METHOD FOR SHARING A CACHED SECURITY PROFILE IN A DATABASE ENVIRONMENT

BACKGROUND OF THE INVENTION

1. Field of the Invention

The invention relates to cached security data. Specifically, the invention relates to apparatus, systems, and methods for sharing a cached security profile in a database environment.

2. Description of the Related Art

Large scale database management systems (LSDBMS), such as IBM's Information Management System (IMS), often have unique operating requirements. For example, these systems should service large volumes of transactions almost simultaneously. Transactions should complete as quickly as possible. Although many thousands of users may be using the LSDBMS at any given time, each transaction should be authenticated to ensure security of the data. The LSDBMS should operate 24/7 with any down time kept to an absolute minimum. Large corporations and other entities invest heavily in the speed, reliability, and security provided by these LSDBMS.

Data maintained by LSDBMSs is often very critical to the owner of the LSDBMS and/or the user. Consequently, certain transactions may authenticate a user's identity and authority multiple times to perform a transaction or parts of the transaction. Such authentication is known as authorization checking. Authorization checking should be done rapidly to minimize delay in completing the transaction.

FIG. 1 illustrates a conventional system 100 configured to rapidly perform authorization checking. The system 100 includes a client application 102, a network 104, and a LSDBMS 106, such as IMS 106. Generally, IMS 106 operates on a server 108 such as a mainframe. The server 108 may execute various operating systems, such as Multiple Virtual Storage (MVS), OS/390, or zSeries/Operating System (z/OS).

The client application 102 may comprise a web-based client, a terminal device, or any other software module configured to execute transactions on the IMS 106. The client 102 sends a transaction request over the network 104. The network 104 may comprise direct terminal connections, a Local Area Network (LAN), the Internet, or the like. IMS 106 executes the transaction and provides a result to the client application 102.

Generally, each transaction requires authorization checking to ensure security of the data. Authorization checking involves reading a security profile (SP) 110 uniquely associated with the user initiating the transaction. Typically, the SP 110 includes information identifying the user and the types of transactions the user is allowed to execute. If the user is identified and authorized according to the SP 110 to execute the transaction, the transaction is allowed to execute. Otherwise, the transaction request is rejected.

Initially, when a user requests a transaction, the SP 110 is loaded from database files 112 maintained by a security software component of server 100 such as the Resource Access Control Facility (RACF) from IBM. Loading the SP 110 incurs I/O overhead as the SP 110 is read from comparatively slow storage devices such as disk drives.

As mentioned above, a single transaction may require multiple authorization checks. In addition, a user of the client application 102 may initiate a series of separate transactions within a relatively short time period. Consequently, to prevent I/O overhead for each transaction, the SP 110 is temporarily stored in a cache 114.

Typically to meet performance objectives, transactions are executed by one or more independent modules in IMS 106. Generally, a transaction request is received by an initial module 116. The initial module 116 typically performs an authorization check using the a cached SP 110. If the SP 110 for a particular user is not cached, the initial module 116 caches the SP 110. If the authorization check is successful, the transaction is queued for execution by a secondary module 118.

In certain circumstances, the secondary module 118 also performs an authorization check. For example, an authorization check may be performed by the secondary module 118 prior to initiating a program switch to complete the transaction. Similarly, the secondary module 118 uses a cached SP 110 for the authorization check, if possible.

Cached SPs 110 should be refreshed periodically to ensure that the most recent data in an SP 110 is used to satisfy authorization checking requests. Consequently, each transaction request received by IMS 106 includes an aging value. The aging value defines a period of time for which the SP 110 is valid in the cache 114. If an initial module 116 or secondary module 118 determines that an SP 110 is as old as, or older than the aging value, the current SP 110 in the cache is deleted and a new version of the SP 110 is loaded.

In addition, to provide security in an emergency situation, the IMS 106 permits a database administrator to force transactions to use only the most recent version of SP 110 for one or more users stored in the database files 112. Typically, the database administrator issues a refresh request message. Consequently, any cached SPs 110 are deleted from the cache 114 by the initial module 116 or secondary module 118 when the next request for a cached SP 110 is made.

Preferably, the initial module 116 and secondary module 118 function asynchronously. Unfortunately, because both modules 116, 118 share access to a single cached SP 110 and are capable of deleting and loading a new version of the cached SP 110, there is a high potential for data inconsistency. For example, both the initial module 116 and secondary module 118 may attempt to use the same SP 110 at substantially the same time. Alternatively, one module, the initial module 116 for example, may delete the SP 110 based on the existing aging value prior to the secondary module 118 having an opportunity to use the SP 110 in an authorization check. The secondary module 118 does not know the particular SP 110 was just deleted. When the secondary module 118 uses the particular SP 110 for an authorization check, the secondary module may experience an error due to the attempt to use the deleted SP 110.

One potential solution is to use a latching or locking methodology for the SPs 110. However, due to the speed at which transactions are processed in the IMS 106, even a momentary delay for one module 116 to release a lock on an SP 110 is unacceptable. Furthermore, avoiding or resolving deadlock conditions between the modules 116, 118 regarding the SP 110 adds additional unacceptable complexity and delay. In addition, latching or locking methodologies do not adequately address responding to an administrator initiated refresh request.

Accordingly, what is needed is an apparatus, system, and method for sharing a cached security profile in a database environment. The apparatus, system, and method should maintain data consistency for cached security profiles without significantly increasing cache management overhead. In addition, the apparatus, system, and method should serialize access by one or more modules to a cached security profile without requiring that the security profile be locked or latched during an authorization check. The apparatus, system, and method should also allow for administrator initiated refresh requests.

BRIEF SUMMARY OF THE INVENTION

The present invention has been developed in response to the present state of the art, and in particular, in response to the problems and needs in the art that have not yet been met for sharing cached security profiles in a database environment. Accordingly, the present invention has been developed to provide an apparatus, system, and method for sharing cached security profiles that overcome many or all of the above-discussed shortcomings in the art.

An apparatus according to the present invention includes a cache module, an identification module, and a refresh module. The cache module caches a security profile accessible to one or more primary tasks and one or more secondary tasks. The primary tasks and secondary tasks may comprise threads or modules executing in a computer system. The identification module distinguishes between primary tasks authorized to refresh the security profile and secondary tasks. Secondary tasks are not permitted to refresh the security profile.

The refresh module selectively refreshes the security profile in response to a refresh request and expiration of the security profile. The refresh request may be initiated by a database administrator. A security profile expires when the age of the security profile meets or exceeds an aging value defined by a transaction. The refresh module refreshes the security profile such that an old version of the security profile is retained for use by secondary tasks until an execution window closes.

In certain embodiments, a deletion module is included that defers deletion of an old version of the security profile until the execution window closes and a subsequent primary task requests access to the cached security profile. Maintaining the old version of the security profile allows secondary tasks to use the security profile. A loader is also provided to load a new version of the security profile. The execution window comprises a period of time between when the cached security profile is created and a predefined threshold. A controller may be included to direct primary tasks requesting a security profile subsequent to refreshing the security profile to a new version of the security profile and currently executing secondary tasks to use the old version of the security profile until the predefined execution window closes.

A system of the present invention is provided for sharing a cached security profile. The system includes a client module, an initial module, and a cache manager. The client module communicates a transaction request to a server over a network. The transaction request is configured to perform an authorization check. The initial module distinguishes between primary tasks and secondary tasks. Only primary tasks are authorized to refresh the security profile. The refresh module selectively refreshes a security profile in response to a refresh request or expiration of the security profile. The refresh module retains an old version of the security profile for use by a secondary task until an execution window closes.

A method of the present invention is also presented for sharing a cached security profile. In one embodiment, the method includes caching a security profile accessible by predefined primary tasks and predefined secondary tasks. Next, only primary tasks are authorized to refresh the security profile. Then, the security profile is selectively refreshed in response to a refresh request and expiration of the security profile. The security profile is refreshed such that an old version of the security profile is retained for use by secondary tasks until an execution window closes.

The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
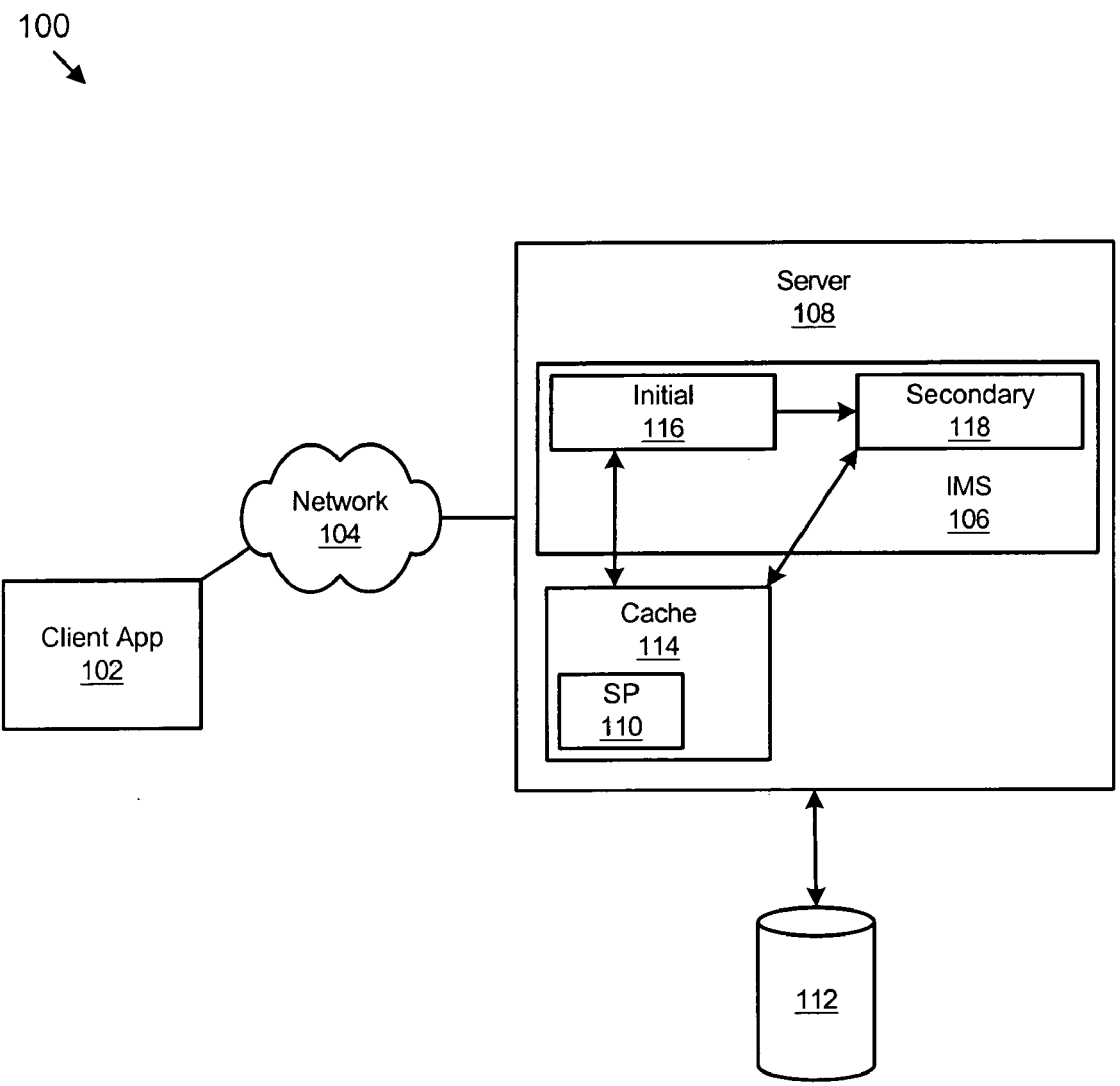
FIG. 1 is a schematic block diagram illustrating a conventional system that shares security profile information.

It will be readily understood that the components of the present invention, as generally described and illustrated in the figures herein, may be arranged and designed in a wide variety of different configurations. Thus, the following more detailed description of the embodiments of the apparatus, system, and method of the present invention, as represented in FIGS. 2 through 6, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, user interfaces, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Figure 2:
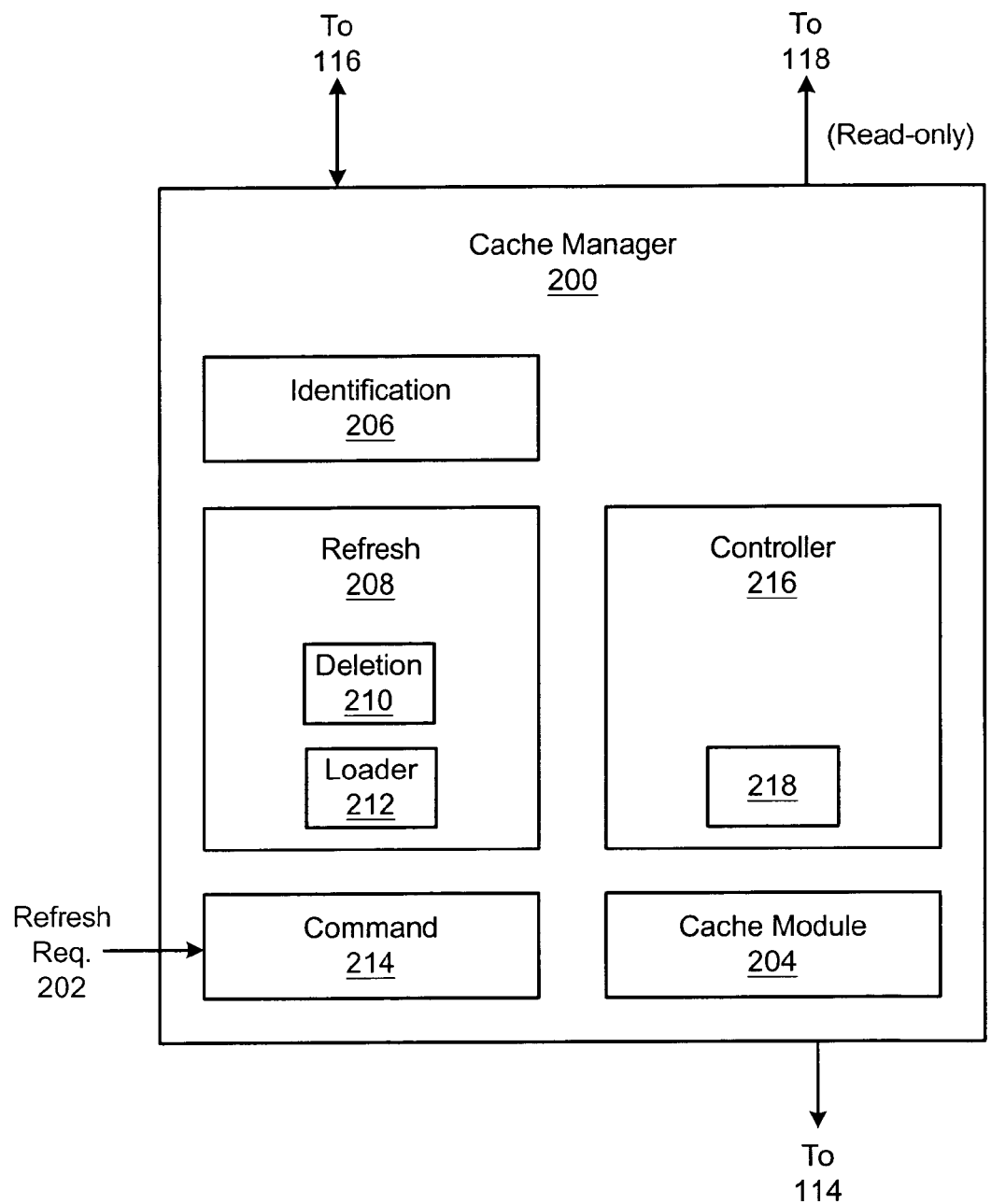
FIG. 2 is a schematic block diagram illustrating one embodiment of an apparatus in accordance with the present invention.

FIG. 2 illustrates a schematic block diagram of one embodiment of a cache manager 200 configured according to the present invention. In the illustrated embodiment, the cache manager 200 executes within a LSDBMS 106 such as IMS 106. The cache manager 200 controls access to cached security profiles (SP) 110 within the cache 114 by the initial module 116 and one or more secondary modules 118 without using latches or locks. The cache manager 200 permits only initial modules 116 to refresh a SP 110. The cache manager 200 allows secondary modules 118 to read, but not refresh, a cached SP 110. In addition, the cache manager 200 prevents use of a cached SP 110 in response to a refresh request 202.

The cache manager 200 includes a cache module 204, an identification module 206, and a refresh module 208. The cache module 204 is configured to load an SP 110 associated with the user that initiated a transaction. The cache module 204 may communicate with a security sub-system such as RACF to load the SP 110 from database files 112 into the cache 114. The cache module 204 may also maintain an index of the SPs 110 in the cache 114. If the requested SP 110 is in the cache 114, the cache module 204 provides the cached SP 110 to the initial module 116 or secondary module 118, for example by setting a pointer.

The identification module 206 distinguishes between requests for an SP 110 that originate from an initial module 116 and those from a secondary module 118. While the terms initial module 116 and secondary module 118 are used herein, those of skill in the art will understand that other terminology specific to a particular computer system may be used which implements the functionality of an initial module 116 or a secondary module 118.

For example, in an IMS system 106, transactions may be divided into a primary task 116 executed in a control Task Control Block (TCB) and one or more secondary tasks 118 executed in a dependent region Task Control Block (TCB). These tasks 116, 118 represent portions of a transaction such as a database request that may be suitably divided and separately executed. Primary tasks 116 and secondary tasks 118 may be executed by a single module or processor using multi-threading methodologies or by a plurality of modules and/or processors in a single computer system or distributed across many computer systems.

The identification module 206 is configured to distinguish between requests for a SP 110 from an initial module 116 or a secondary module 118 regardless of how these modules are defined and identified on different types of servers 108. In an IMS system 106, the identification module 206 may identify requests from an initial module 116 by determining that the request originated from a control TCB. Similarly, requests from a secondary module 118 may be identified by determining that the request originated from a dependent region TCB.

Once identified, the identification module 206 may permit initial modules 116 (or requests there from) to interact with the refresh module 208 to refresh a cache SP 110. The identification module 206 may prevent secondary modules 1118 from refreshing a cache SP 110. Secondary modules 118 may only read from a cached SP 110. In this manner, concurrency of the data in a cached SP 110 is maintained because only the initial module 116 may delete the cached SP 110 and load a new version of the SP 110.

The refresh module 208 permits an initial module 116 to conduct a refresh operation in at least two conditions, in response to a refresh request or natural expiration of the SP 110. A refresh operation comprises deleting a currently cached SP 110 and loading a new version of the SP 110 from the database files 112. However, deletion of the currently cached SP 110 may be delayed, as discussed in more detail below.

The refresh module 208 includes a deletion module 210 and a loader 212. The deletion module 210 deletes the current version of a cached SP 110. In one embodiment, the loader 212 cooperates with the cache module 204 to load a new version of the SP 110. However, because an initial module 116 and one or more secondary modules 118 asynchronously read and use a cached SP 110, the deletion module 210 can not delete the SP 110 until all secondary modules 118 have finished using the cached SP 110. Consequently, the deletion module 210 defers deletion until secondary modules 118 associated with a given transaction have finished executing.

Figure 3:
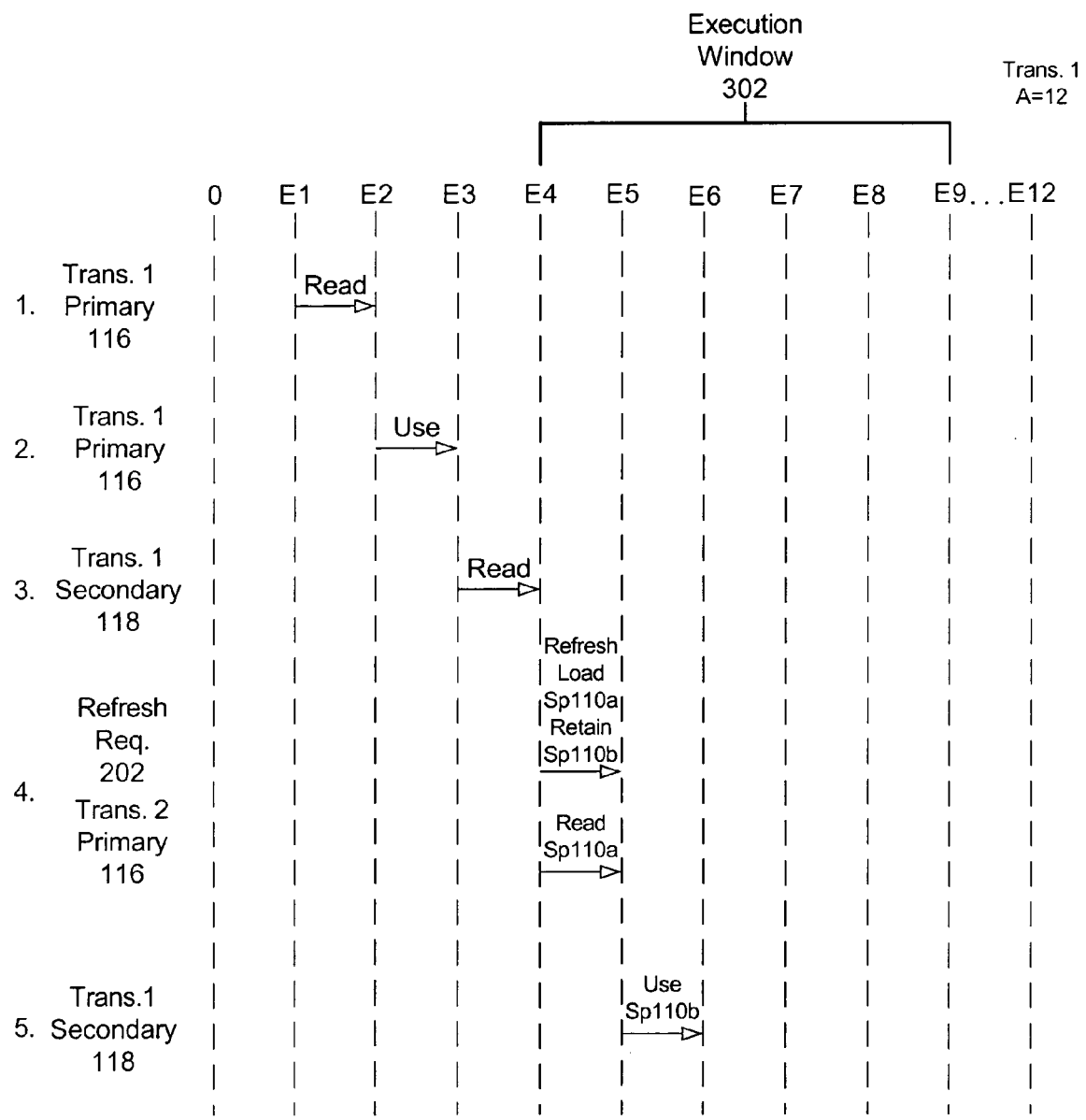
FIG. 3 is an event diagram illustrating a sequence of events within one embodiment of the present invention.

FIG. 3 illustrate a sequence of events in which deferred deletion of an SP 110 is desirable. FIG. 3 is an event diagram. A series of events that may occur at different times in one embodiment of the invention are listed in chronological order along the vertical axis. Periods of time, E, that have elapsed since a particular SP 110 is loaded into the cache 114, comprise the horizontal axis. The periods of time are marked in minutes from zero through eleven. The periods of time are marked in minutes for clarity and convenience, however, those of skill in the art will recognize that the events will not necessarily occur on even minute boundaries and may occur at any time.

In FIG. 3, suppose an SP 10 for a particular user is loaded into the cache 114 at time 0. A first transaction (Trans. 1) is received by the cache manager 200. As mentioned above, each transaction includes an indicator (A) of the aging value (the valid life) for the associated SP 110. Suppose the indicator A for Trans. 1 is 12 minutes (E12, Not shown). Accordingly, SP 110 is valid in the cache 114 until twelve minutes elapse.

Further suppose, Trans. 1 is divided into a primary task 116 and a secondary task 118. At E1, the primary task 116 reads the SP 110 from the cache 114. The cache manager 200 allows the cached SP 110 to be read because the elapsed time, E1, is less than A, E12, and no refresh requests 202 have been made. At time E2, the primary task 116 uses the cached SP 110. At E3, the secondary task 18 reads the cached SP 110 from the cache 114 because E3 is less than A (E12) and no refresh requests 202 have been made.

Next, a refresh request 202 is received and a second transaction (Trans. 2) requests the same cached SP 110 at time E4. Before, a primary task 116 of the second transaction is permitted to read the cached SP 110, the cache manager 200 refreshes the SP 110 because of the refresh request 202.

However, suppose for some reason that the secondary task 118 of the first transaction does not use the cached SP 110 until time E5. In a conventional system, if the cached SP 110 is deleted before the secondary task 118 of the first transaction uses the cached SP 110, the secondary task 118 of the first transaction will encounter an error condition.

In the embodiment illustrated in FIG. 3, the refresh request 202 is executed before the primary task 116 of the second transaction is permitted to read the cached SP 110. The cache manager 200 loads a new version of the SP 10a and retains the old SP 110b. (Discussed in more detail in FIG. 4). The old SP 110b is retained until the secondary task 118 of the first transaction is provided sufficient time to make use of the old cached SP 110b. The deletion module 210 maintains a copy of the cached SP 110 until an execution window 302 closes.

In select embodiments, the present invention defines a period of time for secondary tasks 118 to use old cached SPs 110b. This period of time is referred to herein as an execution window 302. An execution window 302 is defined as the time between when an SP 110 is cached/refreshed and a threshold value Z. In FIG. 3, the execution window 302 is from time E4 until E9. Preferably, the threshold value Z is predefined to be long enough for substantially all secondary tasks 118 to complete execution. In an IMS system 106, Z may be set to five minutes. Of course, Z may be modified by a database administrator as needed.

Suppose the secondary task 118 of the first transaction uses the old cached SP 110b at time E5. Because the deletion of SP 110b has been delayed, the secondary task 118 of the first transaction does not experience an error condition.

When the elapsed time, E, exceeds the threshold value Z, the execution window 302 has closed. Preferably, the deletion module 210 is configured to delete an old version of the cached SP 110 when the execution window 302 has closed. In certain embodiments, to improve efficiency, the deletion module 210 does not delete an old version of a cached SP 110 until a subsequent primary task 116 requests the cached SP 110.

Referring now back to FIG. 2, the cache manager 200 may also include a command module 214 and a controller 216. In one embodiment, the command module 214 receives refresh requests 202. As mentioned above, in an LSDBMS 106 data security should be maintained and operate quickly yet remain flexible to accommodate changes in authorization of users and/or emergency situations. Consequently, although SPs 110 are cached, a system such as IMS 106 should allow for immediate changes in a user's authorization.

Based on the aging value, A, discussed above, SPs 110 may remain in cache 114 for many days, weeks, or longer. During this time, authorization for the user to perform certain transactions may change due to a job change, death, or emergency event. In certain embodiments, a database administrator may broadcast a refresh request 202 message that overrides an aging value to cause SPs 110 to be refreshed. A refresh request 202 may apply to one or more SPs 110. In addition, the refresh request 202 may force all executing transactions to use an SP 110 in the database files 112 until the cached SP 110 is refreshed.

The command module 214 communicates with the refresh module 208 to initiate the refresh. In addition, the command module 214 communicates with the controller 216 such that requests for a cached SP 110 are appropriately directed to database files 112. In certain embodiments, instead of initiating an immediate refresh, the refresh request 202 is noted and carried out when a subsequent initial module 116 requests the particular SP 110. The command module 214 may set a flag or other indicator in a data structure 218 associated with the particular SP 110. When a subsequent initial module 116 requests the particular SP 110, the flag may cause the cache manager 200 to conduct the refresh of the SP 110 and reset the flag.

Figure 4:
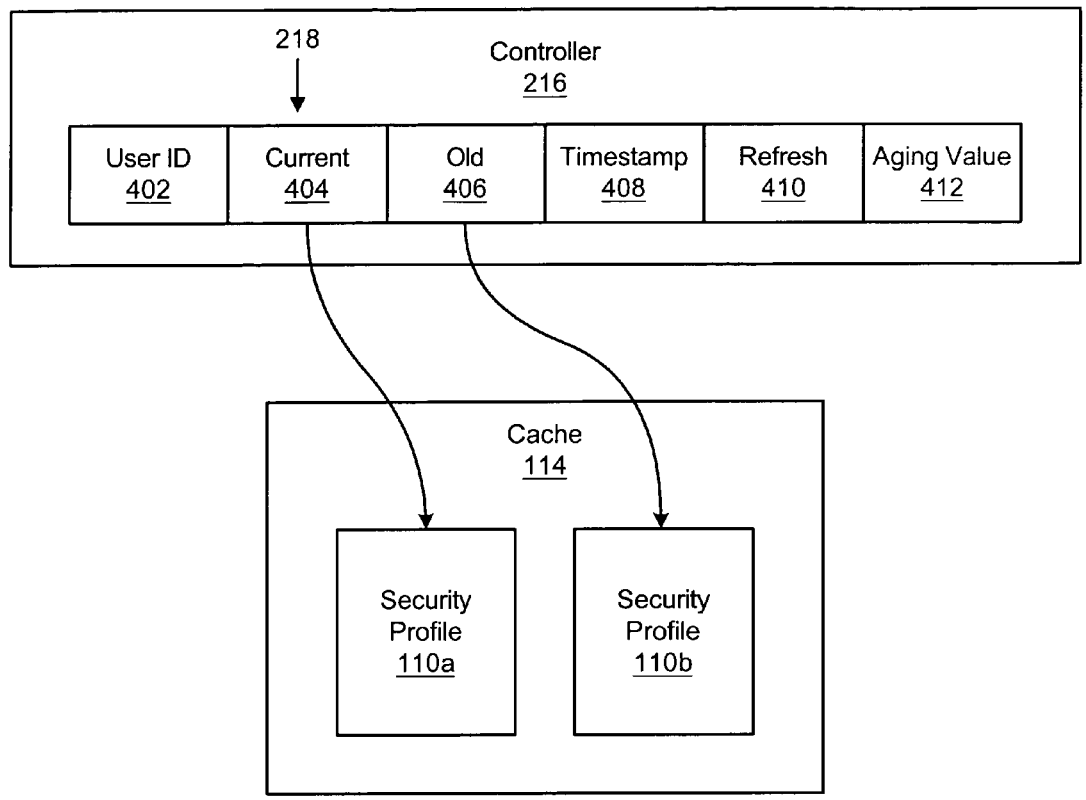
FIG. 4 is a schematic block diagram illustrating a representative data structure suitable for certain embodiments of the present invention.

Referring now to FIG. 4, the controller 216 is described in more detail. In select embodiments, the controller 216 manages requests by the initial module 116 and secondary module 118 for cached SPs 110. Specifically, the controller 216 directs requests from an initial module 116 either to database files 112 or to a new version of the SP 110 based on whether or not the SP 110 has been refreshed. The controller 216 also directs requests from secondary requests 118 attempting to use the cached SP 110 within the execution window 302 to an old version of the SP 110.

The controller 216 uses the data structure 218 to make determinations to satisfy requests for a SP 110. In certain embodiments, actual requests for an SP 110 are not made, instead pointers in the data structure 218 are referenced to locate and use a particular SP 110. Those of skill in the art will recognize that the functions of the cache manager 200 may be implemented using requests or references without departing from the spirit of the present invention. The controller 216 may manipulate the pointers of the data structure 218. In addition, the data structure 218 may be separate or integrated with the SP 110.

In one embodiment, the data structure 218 includes a user ID 402, current SP pointer 404, old SP pointer 406, creation timestamp 408, refresh flag 410, and aging value 412. The user ID 402 uniquely identifies a user with the SP 110. The current SP pointer 404 is an address to the location in cache 114 of the current SP 10a. If the current SP 110a has been refreshed the current SP 110a also represents the new version of the SP 110a. The old SP pointer 406 is an address to the location in cache 114 of the old version of the SP 110b.

If no SP 110a exists in the cache 114, the current SP pointer 404 may be null. If no old version of an SP 110b exists in the cache 114, the old SP pointer 406 may be null. As SPs 110 are loaded and deleted, the controller 216 may adjust the pointers 404, 406 accordingly. By managing two pointers 406, 408, the controller 216 allows all initial modules 116 to read the most current SP 110a and secondary modules 118 to use the old SP 110b for authorization checking within the execution window 302.

The creation timestamp 408 is the time and date that the most current SP 110a was created in the cache 114. The creation timestamp 408 serves as a reference point for calculating the age of a SP 110. The age of the SP 110 is the difference between the creation timestamp 408 and the current timestamp. If the age meets or exceeds the aging value 412, the SP 110 has expired and should be refreshed. The aging value 412, discussed above, is the time period, A, defined by a transaction as the period during which a cached SP 110 is considered valid.

The refresh flag 410 provides an indicator of whether a refresh message 202 has been received for a particular SP 110. As mentioned above, SPs 110 are preferably refreshed in response to a subsequent request for the SP 110 from an initial module 116 executing a second transaction. In this manner, unnecessary I/O overhead is avoided. By setting the refresh flag 410, the command module 214 provides a passive notification of a refresh request 202 without unnecessarily interrupting process flows within the system. The controller 216 may also check the refresh flag 410 to determine whether to direct initial modules 116 and secondary modules 118 to use non-cached SP 110 in the database files 112.

Figure 5A:
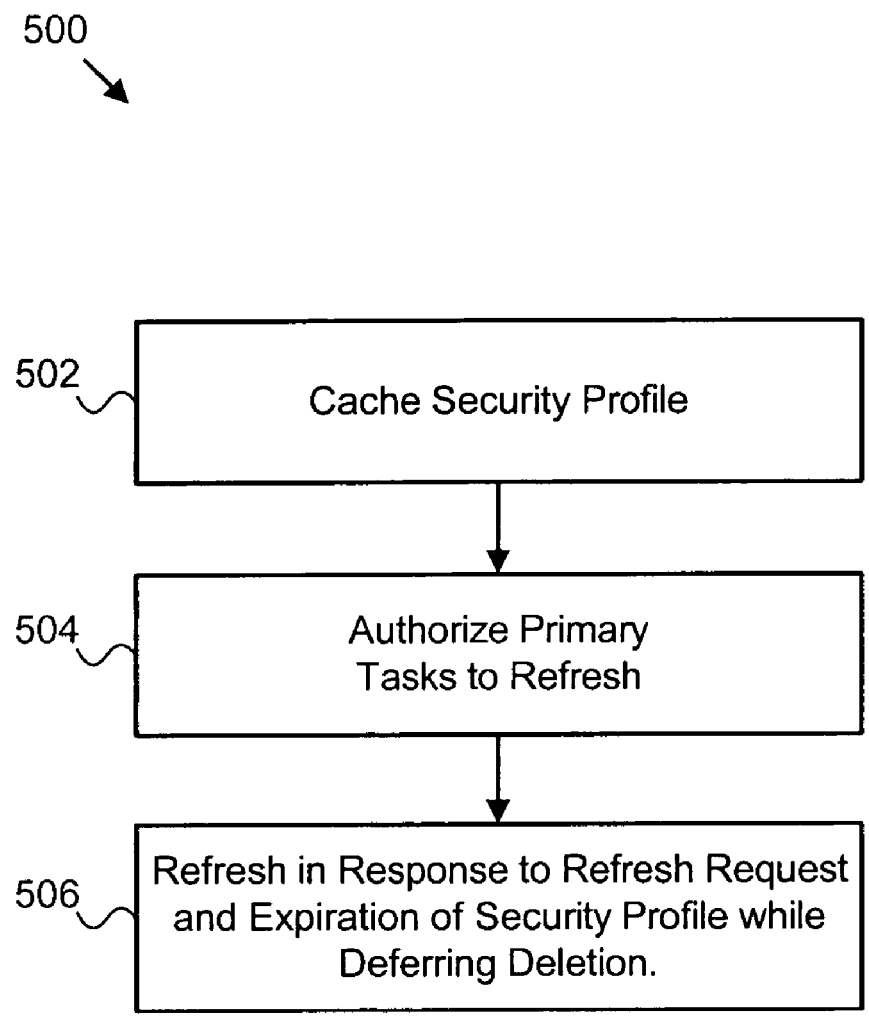
FIG. 5A is a schematic flow chart diagram illustrating a method for sharing a cached security profile.

FIG. 5A illustrates a flow chart of a method 500 for sharing a cached security profile in a database environment. The method 500 begins by caching 502 an SP 110. The SP 110 is made accessible to primary tasks 116 and secondary tasks 118. Next, only primary tasks 116 are authorized 504 to refresh the cached SP 110. The SP 110 is refreshed in response to either a refresh request 202 or expiration of the SP 110. The refresh request 202 may comprise a passive refresh request. Refreshing the SP 110 may include deferring deletion of an old version of the SP 110 until an execution window 302 closes.

Figure 5B:
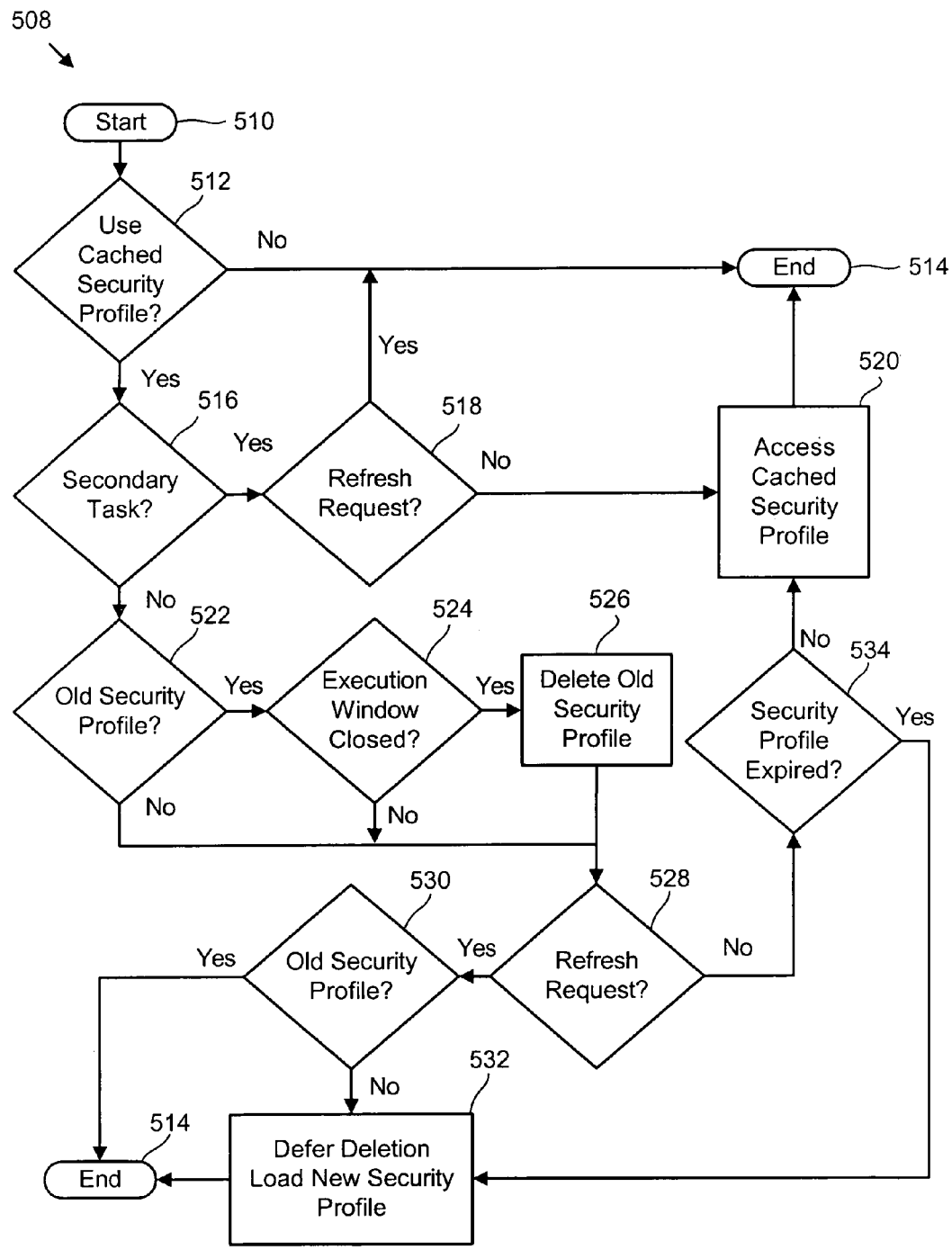
FIG. 5B is a schematic flow chart diagram illustrating, in more detail, a method for sharing a cached security profile in a database environment.

FIG. 5B illustrates a detailed method 508 for sharing a cached security profile in a database environment. The method 508 may be practiced by the cache manager 200 illustrated in FIG. 2. Alternatively, the logic and functionality of the method 508 may be implemented within the initial module 116 (primary task) and/or secondary module 118 (secondary task).

The method 508 begins 510 each time a primary task 116 or secondary task 118 attempts to use a cached SP 110. First, a determination 512 is made whether use of a cached SP 110 is efficient for a particular transaction. In a preferred embodiment, the execution window 302 is as small as possible. If the aging value 412 is less than the threshold value Z used to define the execution window 302, benefits of caching an SP 110 are typically not realized. Consequently, if the aging value 412 is less than Z, the task 116, 118 is sent to the database files 112 (caching is not used) and the method 508 ends 514.

If the aging value 412 is greater than or equal to Z, then the method 508 determines 516 whether the task 116, 118 is a primary task 116 or a secondary task 118. In certain embodiments, the task 116, 118 may include an indicator of it's type. If the task 116, 118 is a secondary task 118, the task 118 is not allowed to refresh a SP 110.

If the task 116, 118 is a secondary task 118, a determination 518 is made whether a refresh request 202 has been made. This may be determined by checking the refresh flag 410 of a data structure 218 for the SP 110. If a refresh request 202 has been made, the secondary task 118 is not permitted to access the cached SP 110 and the method 508 ends 514. If a refresh request 202 has been made, non-cached SP 110 is used. If no refresh request 202 has been made, the secondary task 118 accesses 520 the cached SP 110 and the method 508 ends 514.

If the task 116, 118 is a primary task 116, a determination 522 is made whether an old version of the SP 110 exists. If an old version of the SP 110 exists, a subsequent primary task 116 is now attempting to access the same SP 110. If an old version of the SP 110 exists, a determination 524 is made whether the execution window 302 has closed. The determination 524 may be expressed by the formula: elapsed time E>=threshold value Z.

If the execution window 302 has closed, it is safe to delete the old version of the SP 110. Accordingly, the old version of the SP 110 is deleted 526. In addition, the old SP pointer 404 and current SP pointer 406 may be updated. If the execution window 302 has not closed, a secondary task 118 may still attempt to use the old version of the SP 110.

Accordingly, if the execution window 302 has not closed or the old version of the SP 110 is deleted 526, the method 508 next makes a determination 528 whether a refresh request 202 has been made. If a refresh request 202 has been made, a determination 530 is made whether an old version of the SP 110 exists. If so, the method 508 ends 514, which causes the primary task 116 to go to database files 112 to retrieve the SP 110.

If an old version of the SP 110 does not exist, deletion of the current SP 110 is deferred 532. The current SP 110a becomes the old SP 110b and a new SP 110a is loaded into the cache 114. Then the method 508 ends 514.

If a refresh request 202 has not been made, a determination 534 is made whether the current version of the SP 110 has expired. If so, the elapsed time meets or exceeds the aging value and the method 508 continues by deferring deletion 532 and loading a new version of the SP 110, as discussed above. If the SP 110 has not expired, the cached SP 110 is accessed 520 and the method ends 514.

Figure 6:
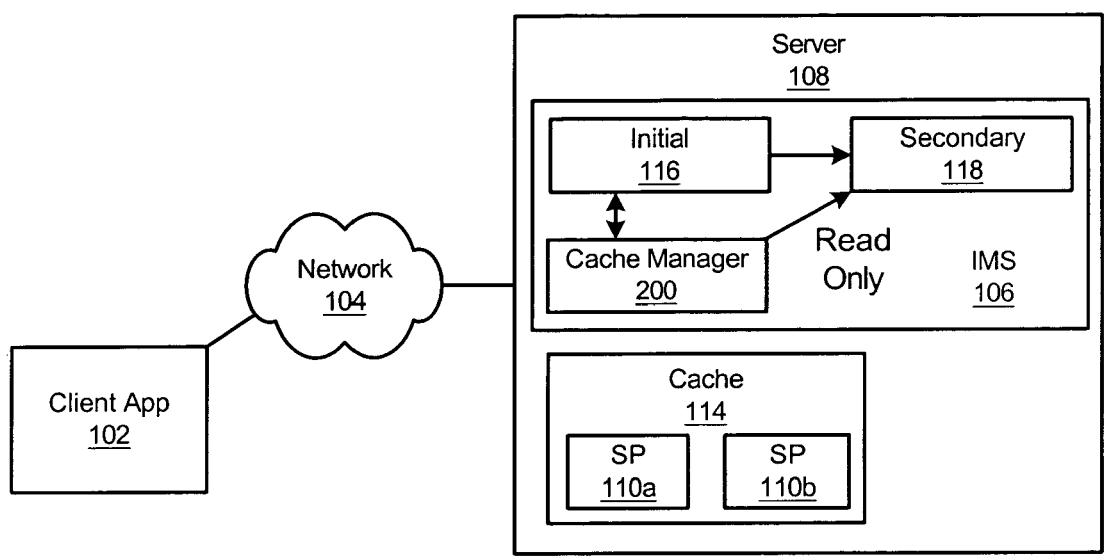
FIG. 6 is a schematic block diagram illustrating one embodiment of a system in accordance with the present invention.

FIG. 6 illustrates a system 600 for sharing a cached security profile in a database environment, such as IMS 106. The system 600 includes conventional components such as a client application 102, network 104, and server 108. The server 108 executes a database environment 106 such as IMS 106 and includes a cache 114. The database environment 106 is configured to receive transaction requests that require an authorization check to authenticate a user.

The database environment 106 includes a cache manager 200 similar to that described in relation to FIG. 2. The cache manager 200 permits an initial module 116 to authenticate a user using a cached SP 110a. The cache manager 200 also refreshes the cached SP 110a in response to a refresh request 202 or expiration of the SP 110. The cache manager 200 refreshes a cached SP 110a by loading a new version of the SP 10a and retaining an old version of the cached SP 110b until an execution window 302 closes.

The cache manager 200 also allows a secondary module 118 to perform an authorization check by reading the cached SP 110a-b. When the secondary module 118 uses the cached SP 10a-b, the cache manager 200 ensures that a cached SP 10a-b exists. The cache manager 200 prevents a secondary module 118 from refreshing a cached SP 110 such that cached SPs 110 remain consistent.

In summary, the present invention provides an apparatus, system, and method for sharing a cached security profile in a database environment. The present invention maintains data consistency for cached security profiles without significantly increasing cache management overhead. The present invention allows an administrator to initiate refresh requests without causing errors involving cached security profiles. In addition, the present invention serializes access by one or more modules to a cached security profile without requiring that the security profile be locked or latched during an authorization check.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for sharing a cached security profile in a database environment, comprising:
    a cache module configured to cache a security profile accessible to primary tasks and secondary tasks;
    an identification module configured to distinguish between primary tasks authorized to refresh the security profile and secondary tasks;
    a refresh module configured to selectively refresh the security profile in response to a refresh request and expiration of the security profile such that an old version of the security profile is retained for use by secondary tasks until an execution window closes; and
    a deletion module configured to defer deletion of the old version of the security profile until the execution window closes and a subsequent primary task requests access to the cached security profile.

2. The apparatus of claim 1, further comprising a loader configured to load a new version of the security profile.

3. The apparatus of claim 1, further comprising a command module configured to associate an indicator of the refresh request with the cached security profile.

4. The apparatus of claim 1, wherein the execution window comprises a period of time between when the cached security profile is created and a predefined threshold.

5. The apparatus of claim 1, wherein the security profile comprises an aging value and wherein expiration of the security profile comprises an age of the cached security profile meeting or exceeding the aging value.

6. The apparatus of claim 5, wherein the age of the cached security profile comprises the difference between a creation timestamp associated with the cached security profile and a current timestamp.

7. The apparatus of claim 1, wherein the refresh request comprises a passive notification to the refresh module to refresh the cached security profile.

8. The apparatus of claim 1, further comprising a controller configured to direct primary tasks requesting a security profile subsequent to refreshing the security profile to a new version of the security profile and currently executing secondary tasks to use the old version of the security profile until the predefined execution window closes.

9. The apparatus of claim 8, wherein the controller is configured to require a primary task and a secondary task to use a non-cached security profile in response to a refresh request.

10. A system for sharing a cached security profile, comprising:
    a client module configured to communicate a transaction request to a server over a network, the requested transaction configured to perform an authorization check to authenticate a user;
    an initial module configured to receive and execute the transaction request and authenticate the user using a cached security profile; and
    a cache manager configured to provide the security profile associated with the user to the interface module and selectively refresh the security profile in response to a refresh request and expiration of the security profile such that deletion of an old version of the security profile is deferred until an execution window closes.

11. The system of claim 10, wherein the transaction initiates a secondary module configured to perform an authorization check to authenticate the user by reading the cached security profile.

12. The system of claim 11, wherein the secondary module uses the old version of the security profile in response to the cache manager refreshing an expired security profile within the execution window.

13. The system of claim 10, further comprising a command module configured to communicate a refresh request to the cache manager.

14. The system of claim 10, wherein the execution window comprises a period of time between when the cached security profile is created and a predefined threshold.

15. The system of claim 10, wherein the security profile comprises an aging value and wherein expiration of the security profile comprises an age of the cached security profile meeting or exceeding the aging value.

16. The system of claim 15, wherein the age of the cached security profile comprises the difference between a creation timestamp associated with the cached security profile and a current timestamp.

17. The system of claim 10, wherein the refresh request comprises a passive notification to the cache manager to refresh the cached security profile.

18. The system of claim 10, wherein the cache manager is configured to provide a non-cached security profile to the initial module in response to a refresh request.

19. The system of claim 10, wherein the server comprises an Information Management System (IMS) database environment.

20. An article of manufacture comprising a program storage medium readable by a processor and embodying one or more instructions executable by a processor to perform a method for sharing a cached security profile in a database environment, the method comprising:
    caching a security profile accessible by predefined primary tasks and predefined secondary tasks;
    authorizing primary tasks to refresh the security profile; and
    selectively refreshing the security profile in response to a refresh request and expiration of the security profile such that an old version of the security profile is retained for use by secondary tasks until an execution window closes.

21. The article of manufacture of claim 20, wherein refreshing the security profile further comprises deferring deletion of the old version of the security profile until the execution window closes and a subsequent primary task requests access to the cached security profile.

22. The article of manufacture of claim 20, wherein refreshing the security profile further comprises loading a new version of the security profile.

23. The article of manufacture of claim 20, wherein the execution window comprises a period of time between when the cached security profile is created and a predefined threshold.

24. The article of manufacture of claim 20, wherein the security profile comprises an aging value and wherein expiration of the security profile comprises an age of the cached security profile meeting or exceeding the aging value.

25. The article of manufacture of claim 24, wherein the age of the cached security profile comprises the difference between a creation timestamp associated with the cached security profile and a current timestamp.

26. The article of manufacture of claim 20, further comprising preventing secondary tasks from refreshing the security profile.

27. The article of manufacture of claim 20, wherein the refresh request comprises a command issued by a database administrator.

28. The article of manufacture of claim 20, wherein the refresh request comprises a passive notification to primary tasks and secondary tasks to stop using the cached security profile.

29. The article of manufacture of claim 20, further comprising directing subsequent primary tasks to use a new version of the security profile and currently executing secondary tasks to use the old version of the security profile until the predefined execution window closes.

* * * * *